Nov. 24, 1970 J. F. FINK, JR 3,542,628

TAPE APPLICATOR HAVING NON-STICK SURFACE

Filed Sept. 30, 1968

INVENTOR,
JOHN F. FINK, JR.

BY Christen, Sabol & O'Brien

ATTORNEYS

United States Patent Office 3,542,628

Patented Nov. 24, 1970

3,542,628

TAPE APPLICATOR HAVING NON-STICK SURFACE

John F. Fink, Jr., 15407 Compton Road, Centreville, Va. 22020

Continuation-in-part of application Ser. No. 457,735, May 21, 1965. This application Sept. 30, 1968, Ser. No. 763,504

Int. Cl. B31b *1/20*

U.S. Cl. 156—527 11 Claims

ABSTRACT OF THE DISCLOSURE

A tape applicator comprising a body having a spindle attached thereto for supporting a roll of tape, guide means for feeding the tape from the spindle to tape dispensing means having an upturned pressure lip and a serrated edge for cutting the tape. The dispensing means includes surfaces of a non-stick substance such as Teflon whereby both single-side adhesive tape and double-side adhesive tape may be accurately and precisely deployed.

CROSS-REFERENCE TO RELATED APPLICATION

The present application is a continuation-in-part of pending application Ser. No. 457,735 to John F. Fink, Jr. filed May 21, 1965, and now Pat. No. 3,404,058.

BACKGROUND OF THE INVENTION

The present invention pertains to tape applicators and more particularly to tape applicators for accurately dispensing both single-side adhesive tape and double-side adhesive tape.

Single-side adhesive and double-side adhesive tapes have many industrial uses as well as the myriad of uses found for tapes in the home and office. For instance, single-side adhesive tapes are utilized in the manufacture of printed circuits to provide accurate patterns from which a printed circuit board may be etched and are very useful in drafting. Double-side adhesive tape is utilized to great advantage to temporarily post signs, labels and other indicia on fragile or delicate surfaces, such as the body of a new automobile, and double-side adhesive tape is generally useful in any situation where temporary or permanent affixing of an object or objects is required without the affixing means being viewable. For example, doube-side adhesive tape may be utilized to both secure a first object, such as the wrapping on a package, and to secure a second object to the first object, such as ribbon or bows.

In the past the use of double-side adhesive tape has been curtailed due to the lack of a suitable applicator. That is, due to both sides of the tape being sticky, the tape cannot be easily unwound from a roll and cannot touch any objects thereby preventing accurate dispensing with the use of guides and smoothing surfaces.

The above mentioned problem does not exist with single-side adhesive tape in that in applying single-side adhesive tape to a surface, the smooth side of the tape may touch guides and smoothing surfaces to permit even deployment of the tape. However, even when utilizing single-side adhesive tape, a problem exists in that conventional applicators have a great amount of friction to be overcome when deploying the tape, and the force required to overcome this friction causes inaccurate deployment of the tape. This problem is acute when single-side adhesive tape is utilized for precision work in industry and for predetermined forms and shapes in art work and everyday uses.

SUMMARY OF THE INVENTION

Accordingly, it is an object of the present invention to construct a tape applicator with reduced friction capable of dispensing double-side adhesive tape accurately.

Another object of the present invention is to utilize a non-stick substance on the guide surfaces of a tape applicator.

The present invention has another object in that a tape applicator is constructed having dispensing means comprised of a non-stick substance to reduce friction.

A further object of the present invention is to utilize a roller with a non-stick substance on the surface thereof to accurately deploy tape.

Some of the advantages of the tape applicator of the present invention over conventional tape applicators are that double-side adhesive tape may be dispensed accurately without sticking to guide means within the applicator, tape may be deployed and cut easily with only one hand, and tape may be deployed on a surface without the use of disruptive force.

The present invention is generally characterized in that a tape applicator comprises support means for supporting a roll of tape, dispensing means for deploying tape, and guide means for guiding tape from the roll to the dispensing means, the dispensing means having surface means comprised of a non-stick substance whereby both single-side adhesive tape and double-side adhesive tape may be accurately deployed.

Other objects and advantages of the present invention will become apparent from the following description of the preferred embodiments and the accompanying drawings.

DESCRIPTION OF THE PREFERRED EMBODIMENTS

Figures 1, 2:
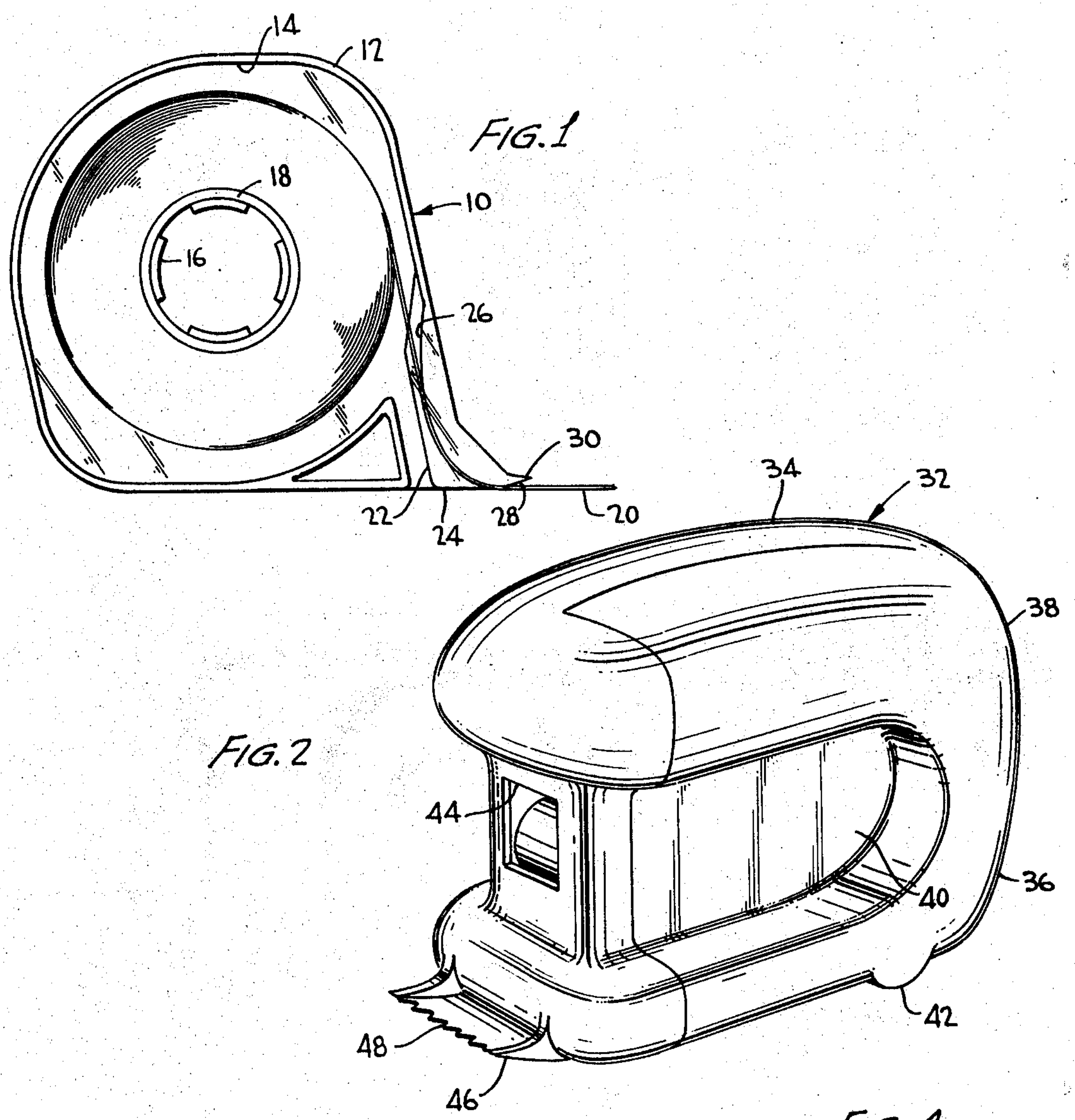
FIG. 1 is a side elevational view of a first embodiment of a tape applicator according to the present invention.
FIG. 2 is a perspective view of a second embodiment of a tape applicator according to the present invention.

FIG. 1 is a side elevational view of a simplified tape applicator 10 constructed in accordance with a first embodiment of the present invention. Tape applicator 10 comprises a plastic body 12, half of which is shown, having a hollow portion 14 for supporting a roll of tape 16 on a spindle 18. Spindle 18 may be permanently attached to a side wall of body 12, and the other half of body 12 may be snapped into place to secure tape 16 on spindle 18. The end 20 of tape 16 is threaded through a channel 22 formed by the side wall of body 12 and an inner flange 24. A slightly curved guide surface 26 is provided in channel 22 for contacting and guiding tape end 20 as it is unwound in a clockwise direction from tape roll 16.

As described thus far, the tape applicator is conventional with its structural characteristics being dependent only on the diameter of the roll of tape to be utilized and the width of the tape, and the snap assembly of the two halves of the applicator may be accomplished in any desired manner.

According to the present invention an upturned pressure lip 28 extends integrally from the bottom of curved surface 26 and a serrated cutting edge 30 is provided at the end of lip 28. Cutting edge 30 may be formed integrally with body 12, or a metal serrated edge may be attached to the end of lip 28. When tape applicator 10 is placed on a level surface, the bottom of body 12 along with the lower most portion of lip 28 support the applicator, and serrated edge 30 is disposed above the level of the surface.

Guide surface 26 and pressure lip 28 may be either coated with a non-stick substance, such as polytetrafluoroethylene, which is a material sold under the trademark Teflon, or the parts of body 12 utilized to form surface 26 and lip 28 may be constructed entirely of a non-stick substance, such as Teflon.

In operation tape end 20 is threaded through channel 22 and pressed onto a location on a surface at which it is desired to begin placement of the tape. Tape 16 may be either single-side adhesive tape or double-side adhesive tape, and when using single-side adhesive tape the edge may be started by either securing the tape to the beginning location on the surface with a finger or implement utilized in the hand or by applying pressure to lip 28. When using double-side adhesive tape, it is advisable to utilize pressure on lip 28 to initially secure the tape to the surface because due to its non-stick surface lip 28 will permit easy starting without tending to pull up the tape. After the tape is initially secured to the surface, in which case tape applicator 10 may be tilted up on lip 28 to apply pressure, the tape applicator 10 is replaced to its level position and the tape applicator moved to dispense the tape and at the same time cause it to be secured evenly to the surface by pressure on lip 28.

When single-side adhesive tape is desired to be dispensed, the non-stick coating on surface 26 and lip 28 permits accurate deployment of the tape with very little friction or sticking within the tape applicator as compared to conventional applicators for single-side adhesive tape. The tape applicator of FIG. 1 may also be effectively utilized with double-side adhesive tape because although surface 26 and lip 28 are exposed to adhesive after the tape is unwound from the roll, the non-stick substance permits the tape to slide unrestricted over surface 26 and lip 28.

FIG. 2 is a perspective view of a second embodiment of a tape applicator according to the present invention which includes a casing body 32 formed of two sections 34 and 36. Body 32 is formed with a thickened arcuate portion 38 at the top and bottom and a depressed center portion 40. At the bottom rear of body 32 is a protruding rib 42 which is formed integrally with the body and extends across the width thereof. A window 44 is disposed in section 34 in the front of body 32, and an upturned pressure lip 46, having a serrated cutting edge 48 secured to the end thereof is formed integrally with section 34 of body 32. Serrated edge 48 may be former integrally with lip 46 or it may comprise a metal strip attached to the end of the lip. The bottom portion of body 32 has a slot 50 disposed near the front thereof to permit a roller 52 to extend therethrough as can best be seen from FIG. 3.

Due to the unsymmetrical assembly of body 32 the dispensing and guiding means, to be described hereinafter, may be formed integrally in the front portion of body 32 to provide economical and sturdy manufacture; however, it is clear that other body assemblies may be utilized with the present invention without the advantages of the illustrated assembly.

A spindle or other tape mounting means 54 may be permanently secured to a hollow portion of section 34 of body 32 in order to support a roll of tape 56 which may be unwound through counterclockwise rotation, and an end 58 of tape 56 is threaded around a guide 60 which has a curved surface and is permamently secured to section 34 of body 32 between the side faces of the front portion. Guide 60 may be a rotating cylinder, a stationary cylinder or a stationary partially curved structure since the important criterion is that no great resistance to the sliding of tape thereover be caused by the shape of the guide and that the guide be disposed adjacent window 44 so that tape end 58 is viewable through window 44. After being wound past guide 60, tape end 58 is threaded around roller 52 which is secured to section 34 of body 32 between the two side portions of the front section in a manner similar to that of guide 60.

Figure 4:
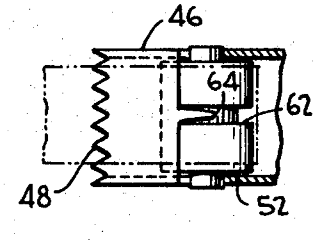
FIG. 4 is a broken view of the dispensing means of the second embodiment of the present invention.

Roller 52 is formed with a center peripheral groove 62 which receives a tongue 64 extending from lip 46, as shown in FIG. 4. Tongue 64 may be arcuate with a diameter substantially equal to that of the outer edge of roller 52 such that tape rolling around roller 52 cannot continue on roller 52 but must exit along lip 46.

Depending upon the ease of operation desired, either roller 52, lip 46 and/or guide 60 may be coated with a non-stick substance such as Teflon, or these elements may be formed integrally with the body of a solid non-stick substance, such as Teflon.

Figure 3:
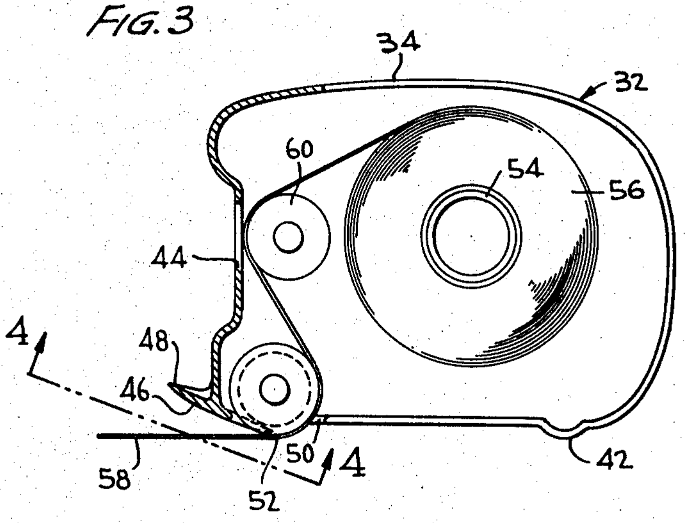
FIG. 3 is a sectional view of the tape applicator of FIG. 2.

When utilizing the tape applicator of FIG. 2 with double-side adhesive tape, the tape is threaded as shown in FIG. 3, and will extend to lip 46 due to the association of tongue 64 with roller 52.

In order to commence deployment of tape 58, lip 46 is pressed down by rotating body 32 counterclockwise on lip 46 to apply pressure to the tape. The tape applicator is then replaced to its level position and moved so as to cause roller 52 to rotate clockwise pulling the tape across guide 60 and around roller 52 to be deployed on a surface. Roller 52 acts to apply even pressure to the tape as it is being deployed on the surface and even though double-side adhesive tape is utilized, it will not stick to guide 60 or roller 52 due to the non-stick substance on the surface thereof, thereby permitting the accurate deployment of double-side adhesive tape. After the tape has been deployed, serrated edge 48 may be utilized to cut the tape by merely placing a finger through window 44 to press tape 58 against guide 60 to thereby prevent further dispensing of the tape and twisting the serrated edge across the tape to cut it neatly and precisely.

It is clear that other means may be utilized to hold or grasp tape 54 to prevent its further unwinding when cutting the tape, and guide 60 is shown as being used for holding the tape for illustrative purposes only.

Roller 52 may be made entirely of a solid non-stick substance or may be coated therewith, and if the surface on which tape is to be applied is delicate or fragile, roller 52 may be made of a soft material such as rubber with a non-stick coating thereon in order not to damage the surface.

The unique structure of the embodiment of FIGS. 2, 3 and 4 permits the accurate deployment of double-side adhesive tape due to the non-stick surfaces over which the adhesive side of the tape can slide with minimum friction and sticking. Pressure lip 46 may be utilized to smooth the tape after it is initially deployed by roller 52 due to the non-stick surface of lip 46.

Inasmuch as the present invention is subject to many modifications and changes in detail, it is intended that all matter described in the specification or shown in the drawings be interpreted as illustrative and not in a limiting sense.

What is claimed is:

1. A tape applicator comprising support means for supporting a roll of tape; dispensing means for deploying tape on a surface; and guide means for guiding tape from said support means to said dispensing means; said dispensing means including surface means including a pressure lip and a serrated cutting edge secured thereto, said surface means also including a roller disposed adjacent said pressure lip to feed tape from the guide means past the pressure lip said roller having a peripheral groove therein, said pressure lip having a tongue projecting into said groove along which tape slides as it is deployed, said surface means comprising a non-stick substance; whereby both single-side adhesive tape and double-side adhesive tape may be accurately deployed due to said non-stick substance causing reduction in friction at said dispensing means.

2. The invention as recited in claim 1 wherein said non-stick substance is polytetrafluoroethylene.

3. The invention as recited in claim 1 wherein said surface means includes a pressure lip; and said dispensing means further includes a serrated cutting edge secured to said pressure lip.

4. The invention as recited in claim 3 wherein said surface means includes a roller, said roller being disposed adjacent said pressure lip in order to feed tape from said guide means past said pressure lip.

5. The invention as recited in claim 1 wherein said guide means includes a curved surface comprising a non-stick substance.

6. The invention as recited in claim 4 wherein said roller has a peripheral groove therein; and said pressure lip has a tongue extending therefrom and inserted in said peripheral groove whereby tape is removed from said roller and dispensed.

7. The invention as recited in claim 1 wherein said guide means includes a channel having a surface at one end thereof comprising a non-stick substance.

8. A tape applicator comprising casing means including support means for supporting a roll of tape, a front face having a window therein, a pressure lip provided with a serrated edge at the end thereof disposed at the bottom of said front face, and a bottom portion having a slot therein; a roller having a peripheral groove supported by said casing means and disposed adjacent said bottom portion to extend through said slot for deploying tape on a surface; said pressure lip including a tongue extending into said peripheral slot and guide means disposed adjacent said window for guiding tape from said support means to said roller means; said roller means having a surface comprising a non-stick substance; whereby both single-side adhesive tape and double-side adhesive tape may be accurately deployed due to said non-stick substance causing reduction in friction.

9. The invention as recited in claim 8 wherein said pressure lip has a surface comprising a non-stick substance.

10. The invention as recited in claim 9 wherein said guide means has a curved surface comprising a non-stick substance.

11. The invention as recited in claim 10 wherein said non-stick substance comprising the surface of said roller means, the surface of said pressure lip, and the curved surface of said guide means is polytetrafluoroethylene.

References Cited

UNITED STATES PATENTS

| | | | |
|---|---|---|---|
| 2,368,262 | 1/1945 | Oftedahl et al. | 156—526 |
| 2,493,737 | 1/1950 | Burns | 156—523 |
| 2,584,065 | 1/1952 | Taylor | 156—523 |
| 2,722,331 | 11/1955 | Vogt | 156—527 |

VERLIN R. PENDEGRASS, Primary Examiner

U.S. Cl. X.R.

156—577